Patented June 16, 1936

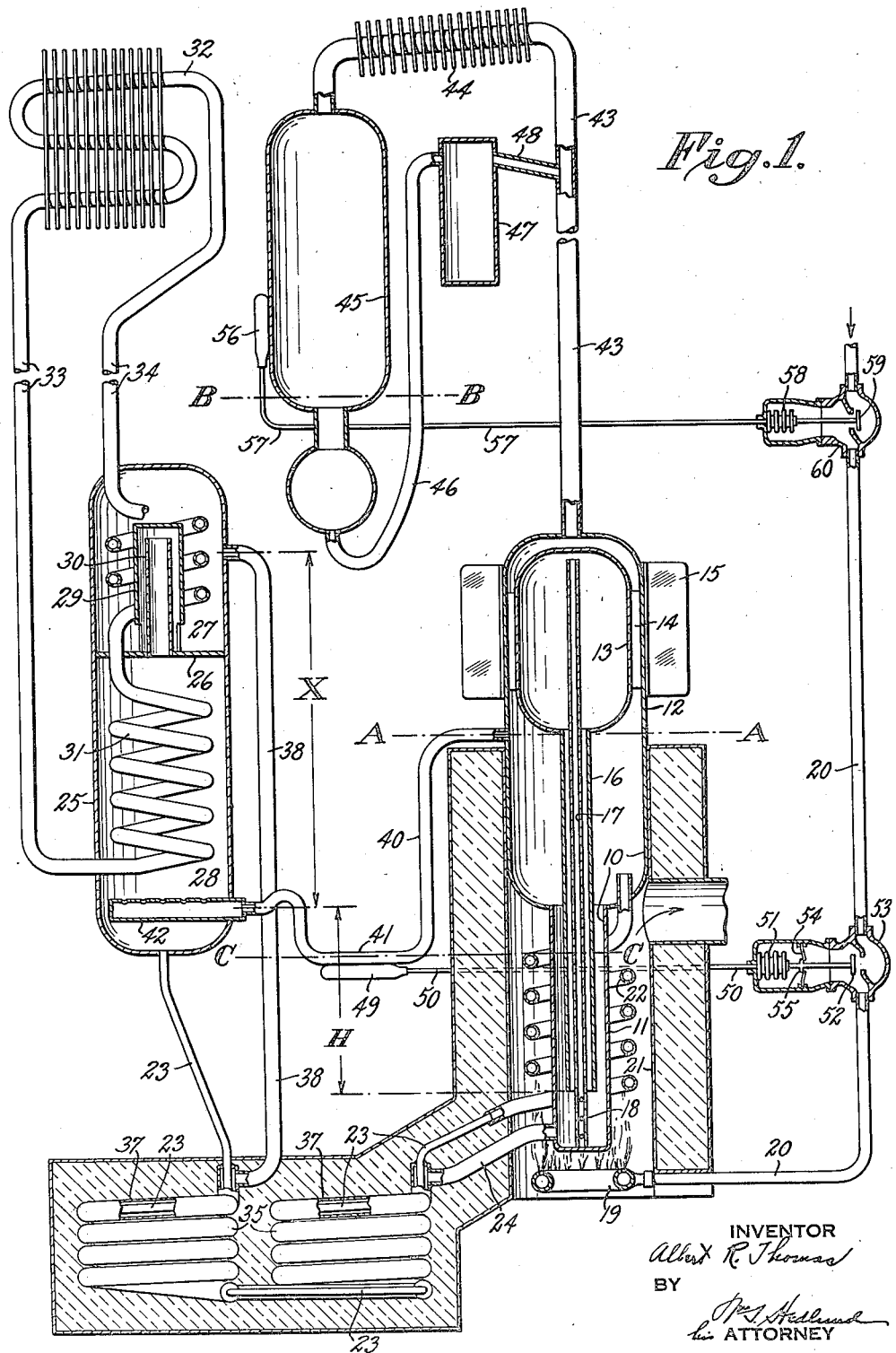

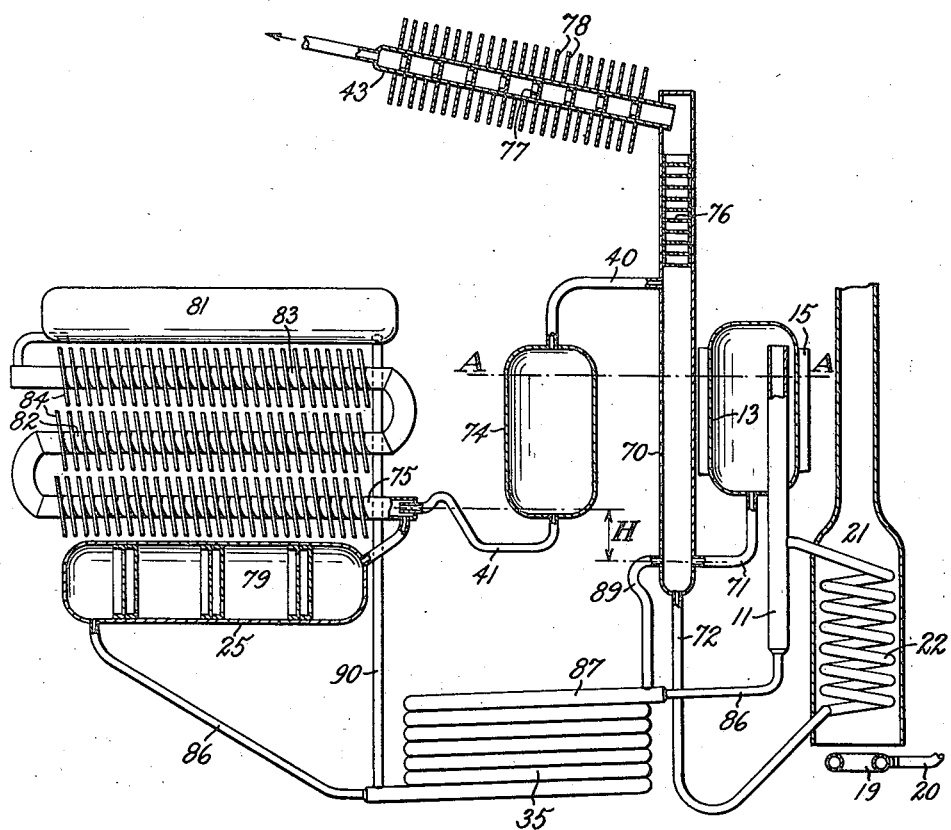

2,044,597

UNITED STATES PATENT OFFICE 2,044,597

REFRIGERATION

Albert R. Thomas, Evansville, Ind., assignor, by mesne assignments, to Servel, Inc., Dover, Del., a corporation of Delaware Application January 29, 1934, Serial No. 708,800

28 Claims. (Cl. 62—118)

My invention relates to absorption refrigeration systems of the kind having periods of expulsion of refrigerant vapor from solution alternating with periods of absorption and evaporation. This type of system is generally known as an intermittent system. The expulsion or distillation and concurrent condensation take place at high pressure. The absorption of the refrigerant vapor and the evaporation take place at low pressure. Consequently there is an alternation of high pressure and low pressure periods.

A system of this kind has been proposed by Carl G. Munters, in which the absorption liquid is conducted in a path during the heating or expulsion period in which it is heated to drive off refrigerant vapor, the residual liquid is then cooled, preferably by liquid heat interchange, and the cooled liquid is stored and may even be cooled during the heating period. More specifically my invention relates to this type of system.

In an intermittent system, the generator or boiler is heated during the heating or expulsion period to a relatively high temperature. The liquid in the generator at the end of the heating period must be cooled. The quicker this cooling can take place, the quicker the absorption and evaporation can begin. It is one object of my invention to quickly cool the generator contents at the end of the heating period. I preferably accomplish this by conducting vapor at the end of the heating period to cold stored absorption liquid at the time of cutting off the heat supply so that a rapid decrease of pressure and temperature takes place in the generator.

Another object of my invention is to conduct vapor from the evaporator to cold stored absorption liquid below the surface thereof without providing a liquid column between the generator and the evaporator. Such a liquid column necessitates a nucleus of absorption liquid which absorbs and gives off refrigerant vapor and is a detriment from the point of view of efficiency of distillation, condensation and absorption.

Another object of my invention is to automatically regulate the rate of absorption due to forces within the system of apparatus.

Still another object of my invention is to utilize variation of liquid surface level in the generator to control the system and in this connection I store cold liquid above the level of liquid in the generator and provide means for withdrawing liquid from the active portion of the system to allow absorption and take care of the variation of volume of absorption liquid due to absorption of refrigerant during the absorption period.

Further objects and the nature and advantages of my invention will be understood from the following descriptions of preferred forms thereof taken in connection with the accompanying drawings forming part of this specification and of which:

Fig. 1 is an elevational sectional view of an apparatus embodying the invention; and Fig. 2 is a similar showing of another system embodying the invention.

The system shown in Fig. 1 comprises a generator 10 including a narrow lower tube or pocket 11 and a wider upper part 12. Within the generator is a vessel 13 which may be termed a suction vessel. Vessel 13 may be supported by webs 14 between vessel 13 and the shell of the generator. A space is provided between vessel 13 and the generator shell for flow of vapor. Fins 15 extend outwardly from the shell of the generator to be subject to surrounding atmosphere for cooling, principally to cool and condense vapor of absorption liquid entrained with refrigerant vapor.

Vessel 13 is closed except at the bottom where a tube 16 is connected which extends downwardly to near the bottom of pocket 11. Vessel 13 and tube 16 constitute a hollow dead-end element or inverted bottle or vessel closed except at the bottom and connected to the liquid space of the generator. A pipe 17 may be provided within vessel 13 and tube 16, opening at the top within and at the top of vessel 13 and communicating at the bottom with the liquid space of the generator as by holes 18 to facilitate emptying of the vessel 13 and tube 16.

Below the generator is a gas burner 19 supplied with gas from a conduit 20. Burner 19 is disposed within a flue 21. Any other type of heating means may be employed.

Within flue 21 and surrounding and spaced from pocket 11 is a helical thermo-syphon coil 22 connected at its upper end to the lower part of member 12 and connected at its lower end to a conduit 23. Connected to the lower end of pocket 11 is a conduit 24.

To one side of the generator and thermally separate therefrom is a cold absorption liquid storage reservoir 25. This vessel is also the absorber, although absorption may take place in a conduit connected thereto. A partition 26 divides the reservoir 25 into upper and lower chambers 27 and 28 communicating through a passage between tubes 29 and 30 of such nature as to permit movement of liquid therethrough between chambers 27 and 28 without permitting circulation between the two or turbulence of liquid. However it is not necessary to provide the internal subdivision of reservoir 25 as the liquid therein is substantially stagnant due to the arrangement of parts.

Within reservoir 25 is a cooling coil 31 connected at the bottom and top respectively with the bottom and top respectively of a condenser 32 by means of conduits 33 and 34. Cooling coil 31, condenser 32 and conduits 33 and 34 are hermetically sealed and are partially filled with a volatile fluid such as methyl chloride, propane or butane. Condenser 32 may be air-cooled as shown or may be water-cooled. Alternatively reservoir 25 may be directly air-cooled or water-cooled.

Below the generator and absorber-reservoir is a liquid heat exchanger comprising inner and outer concentric conduits 23 and 37. Inner tube 23 is connected at one end to thermo-syphon coil 22 and at the other end to the bottom of reservoir 25. Outer conduit 37 is connected at one end to conduit 24 and at the other end to a conduit 38 in turn connected to chamber 27. It will be noted that reservoir 25 is connected by means of conduits 22, 23, 24, 37 and 38 with the generator and with vessel 13 and that these are connections with the liquid space of the generator. There is no gas equalizing connection with the upper part of the absorber-reservoir 25. Like the vessel 13, the absorber-reservoir 25 is an inverted bottle with respect to the liquid exposed to gas and communicating with the evaporator.

A conduit 40 is connected to an intermediate point of generator 10 which is preferably at about the level of liquid surface in the generator at the beginning of the heating period. Conduit 40 extends downwardly and again upwardly to form a trap 41. The other end of conduit 40 is connected to the lower part of absorber-reservoir 25, as by a perforated distributor 42. The bottom of trap 41 is at the level of the surface of liquid in the generator at the end of the heating period.

Connected to the top of the generator 10 is a conduit 43 for conducting vapor to a condenser 44. The condenser is connected to the evaporator 45 so that refrigerant liquefied in the condenser flows by gravity into the evaporator. The evaporator or a cold conducting member in heat exchange relation with the evaporator is mounted within the space to be refrigerated or in heat exchange relation therewith. The upper part of the evaporator may be imbedded in insulation. The evaporator may transmit cold to the body or space to be refrigerated through a congealable eutectic solution or a secondary vaporization-condensation cycle such as shown at 31, 32, 33, 34. A drain conduit 46 is connected to the bottom of the evaporator and a drain vessel 47. A conduit 48 connects vessel 47 with conduit 43 at about the high level of liquid in the evaporator.

Mounted in heat exchange relation with trap 41 is a bulb 49 of a thermostat-valve assembly for closing conduit 20 to shut off the heat at the end of the heating period. Bulb 49 is connected by means of tube 50 with a flexible bellows or diaphragm 51 having a movable part connected to a valve member 52 adapted to close a valve 53 in conduit 20. Parts 49, 50 and 51 are partially filled with a volatile liquid such as methyl chloride or propane. Valve 53 is equipped with snap-action mechanism as indicated by leaf springs 54 adapted to snap past a projection 55 on the valve stem. Any of various types of snap-action mechanism may be employed whereby valve 53 will be closed on a rise of temperature to a predetermined value at bulb 49 of, for example, 175° F., but will not open until the temperature at bulb 49 falls to, for example, 100° F.

Attached to evaporator 45 or otherwise suitably disposed in heat exchange with the body to be cooled or a part of the system affected by evaporation is a bulb 56 connected by a tube 57 to a bellows 58 adapted to move a valve member 59 controlling a valve 60 in conduit 20. Parts 56, 57 and 58 are partially filled with a suitable volatile liquid. Valve 60 shall be open whenever the temperature of the evaporator is above a predetermined value, for example, 10° F. Suitable adjusting mechanisms are to be applied to the valves as well understood by the person skilled in the art.

Condensers 32 and 44 may be cooled by the same fins. The parts are all of metal and hermetically sealed. Ammonia is a preferred refrigerant and water a preferred absorption liquid. The drawing is to scale and reproduced from an actual apparatus in which the height X was 12½ inches. The remaining dimensions can be scaled off accordingly, although it will be apparent to the person skilled in the art what dimensions to use and which may be varied.

The apparatus operates as follows:

Assume that the heating period is beginning. The level of liquid in the generator is at A—A. The liquid below this level is an ammonia solution of an average, for example, 35% concentration. The vessel 13, due to application of heat is discharged of liquid and conduits 16 and 17 contain vapor down to their point of connection with the liquid in pocket 11. Tube 17 facilitates passage of vapor into vessel 13 on application of heat to above the liquid surface so that the liquid is readily forced out into the active liquid circulation path. The liquid in the evaporator is near the bottom as at B—B. The reservoir 25 is completely filled with liquid. So also are conduits 23, 24, 37 and 38. Trap 41 and conduit 40 are filled with liquid to the level A—A. The liquid in conduit 41 is below the shut-off temperature for valve 53. Valve 60 is likewise open due to high evaporator temperature.

Due to the application of heat by the burner flame, ammonia vapor is expelled from the absorption liquid in pocket 11 and vessel 12 and in thermo-syphon coil 22. The formation of vapor in the thermo-syphon coil causes circulation of absorption liquid between the reservoir 25 and the generator. This liquid flows upwardly in coil 22, downwardly in pocket 11, through conduits 24, 37 and 38 to the upper part of reservoir 25, between members 29 and 30, through chamber 28, and back through conduit 23 to the thermo-syphon coil. The body of liquid stored in the reservoir 25 is thus circulated once during the heating period.

A little of the liquid is heated at a time in the thermo-syphon coil 22 and the generator. The vapor driven off passes upwardly past webs 14 and to conduit 43. The weakened absorption liquid is withdrawn from the heated zone and flows in conduits 24 and 37 in heat exchange relation with cold strong liquor in conduit 23 passing to the thermo-syphon. The liquid in conduit 23 has come from storage in reservoir 25 in cold condition due to cooling of reservoir 25. Consequently the weakened absorption liquid, as soon as it is heated to drive off the refrigerant is cooled and returned to storage. There is theoretically a continuous slow movement of the division line between weak and strong liquor downwardly in reservoir 25.

Vapor passing upwardly outside vessel 13 is cooled by fins 15 and entrained water vapor is condensed and allowed to flow back into the generator. Refrigerant vapor passes upwardly through conduit 43 into condenser 44 where it is liquefied and from which it flows into the evaporator to accumulate. This liquid does not evaporate as the system is at the high pressure necessary to expel the ammonia from solution.

As the heating period proceeds, the body of absorption liquid shrinks due to the driving off of ammonia. In this system, the variation of liquid volume can only take place in vessel 12 and conduit 40 and consequently the surface is gradually lowered therein. When the level is lowered to the point C—C, the vapor will blow through trap 41 and pass into and be absorbed in the cold absorption liquid in reservoir 25 instead of passing to the condenser. The passage of hot vapor through trap 41 will cause a rise of temperature of bulb 49 toward the temperature of the vapor. This causes an expansion of fluid in bulb 49 and thus valve 53 is closed, thus shutting off the heat (except for a pilot flame to permit automatic relighting for the next cycle). The absorption of ammonia vapor causes a rapid lowering of the pressure in the generator and the temperature likewise drops rapidly. At this time the generator is cooled by means of the fins 15.

This cooling also affects vessel 13 and condensation of ammonia vapor takes place therein allowing entrance of liquid thereinto. This liquid is drawn from the reservoir 25 through conduits 24, 37, 38 and 23, thereby allowing the entry of ammonia vapor into reservoir-absorber 25. Vessel 13 should have a volume greater than the increase in volume of the absorption liquid during the absorption period.

When the pressure has dropped sufficiently in the generator, the ammonia in evaporator 45 evaporates and thus withdraws heat from the surroundings to produce refrigeration. The evaporated ammonia passes through conduit 43, through generator vessel 12 and through conduit 40 to reservoir 25 where it is absorbed. Heat of absorption is given up to the fluid in coil 31 and causes vaporization thereof. The vapor passes upwardly through conduit 34 and is condensed and the liquid returns to coil 31 through conduit 33. This heat is thus carried away. The secondary cooling system 31, 32, 33, 34 may be effective all the time, during both the heating and absorption periods. The rate of evaporation may be controlled by insulating reservoir 25 and controlling the rate of flow in circuit 31, 32, 33, 34 as by a valve in conduit 34 responsive to evaporator temperature.

In order for the gas to enter the reservoir 25 to be absorbed, it is necessary to create a pressure differential. This is accomplished by arranging the point of connection of conduit 40 with vessel 25 at a higher level than the level of the liquid surface in the generator. The maximum level differential is shown by letter H. This maximum level difference is maintained so long as vessel 13 continues to draw vapor upwardly through pipe 16 from the generator. The height of liquid in the absorber leg of the system above the generator level provides a pressure head acting on the vapor in the upper part of the generator which forces the vapor into the vessel 25.

The rate of vapor flow through conduit 40 into absorber 25 is determined solely by the aforementioned pressure differential and the resistance in conduit 40, 41, 42 including the distributing holes. Should this rate of vapor flow, during the first portion of the absorption period, pull down the pressure in the evaporator and generator quicker than the rate at which the vapor pressure in vessel 13 is lowered due to exterior cooling, the drawing of vapor upwardly through conduit 16 will cease so that the liquid level in the generator is no longer determined by the lower end of conduit 16. Thus the unit strikes a balance during the absorption period by producing, within the maximum limits of the driving column, a rate of vapor flow to the absorber to correspond to the rate of cooling of vessel 13. The lowering of the pressure in the unit will be relatively gradual to such an extent that no shocks or condensation knocks will take place in the unit.

The system furthermore adjusts the rate of absorption of vapor to the absorption capacity of the absorber, which is of importance during the later stages of the absorption period. Should the rate of vapor flow into the absorber exceed the prevailing absorption capacity, unabsorbed vapor will collect in the top dead-end portion of the absorber, displacing absorption liquid through conduits 39 and 24 into the generator, raising the generator liquid level and thus automatically decreasing the vapor flow driving column to a value which produces a flow of vapor to correspond to the absorption capacity of absorber 25.

Should the pressure in the system decrease rapidly, vapor will be produced in the upper part of vessel 13, as a result of which liquid will be displaced downwardly in tube 16 and upwardly in the generator, thus decreasing the liquid column pressure head for forcing the gas into the absorber. This also provides automatic regulation of the rate of absorption.

The absorption period continues until the temperature of the evaporator rises to a predetermined value at which valve 60 opens. Valve 53 has already been opened due to lowered temperature in trap 41 wherefore the heat is again applied and the next heating period begins. The application of heat causes the expulsion of liquid from vessel 13 as above described and the liquid level in the generator rises to A—A and the absorber is again filled.

Absorption liquid collecting in the evaporator is drained back to the generator through conduit 46 in a known manner. In addition to this automatic draining I prefer to equip the apparatus with a hand operated drain valve conduit connecting the evaporator and the generator, to be used in connection with installation of the unit, since the evaporator is likely to be flooded with absorption liquid in transit.

In Fig. 2, a thermo-syphon coil 22 is situated in a flue 21. The lower end of the coil is connected by means of conduit 72 to an analyzer vessel or column 70 and the upper end to a tube 11. Tube 11 extends upwardly with vessel 13 and opens near the top thereof. A conduit 71 connects the lower end of vessel 13 with the lower end of vessel 70. A liquid heat exchanger 35 comprises an inner tube 86 connected to tube 11 and to a reservoir-absorber 25 and an outer conduit 87 connected to conduits 89 and 90. Conduit 89 is connected to vessel 70. Conduit 90 is connected to the upper part of the absorber-reservoir.

A conduit 40 is connected to an intermediate point of vessel 70 and to the top of a liquid volume variation vessel 74. A trap 41 connects the bottom of vessel 74 with a tube 75 of the reservoir-absorber. The upper part of vessel 70 contains rectifier discs 76. Rectifier discs 77, 78 are also applied to a backwardly inclined portion of the conduit 43 leading to the condenser and evaporator. The evaporator and condenser may be as shown in Fig. 1.

The reservoir-absorber 25 comprises a lower vessel 79 containing apertured baffling discs 80 for giving unidirectional flow to liquid and an upper vessel 81 connects by intermediate tubing 75, 82, 83 equipped with atmospheric cooling fins 84. These parts are all exposed to the atmosphere. Conduit 90 is connected to vessel 81. The system is provided with a control mechanism similar to that shown in Fig. 1 including a bulb responsive to temperature of trap 41 and a bulb responsive to evaporator temperature controlling flow of gas to a burner heating the thermosyphon coil. The operation of this system is substantially the same as that shown in Fig. 1.

At the start of the heating period, refrigerant vapor driven from solution in coil 22 passes upwardly in tube 11 and displaces liquid from chamber 13 into vessel 70. The amount of liquid displaced from vessel 13 should be enough to raise the liquid level in vessels 70 and 74 to about the level A—A. Vapor of the refrigerant flows through conduit 71 and bubbles through liquid in vessel 70 and passes through the rectifier to the condenser and evaporator. During the heating period liquid flows upwardly in coil 22, into tube 11, from tube 11 through conduit 86 and heat exchanger 35 into the bottom of the reservoir-absorber 25, gradually through members 79, 75, 82, 83 and 81, downwardly through conduit 90, through the outer tube 87 of the heat exchanger, through conduit 89 and back to the thermosyphon coil through conduit 72. The absorber pipes 75, 82 and 83 are continuously cooled by surrounding atmosphere and cold liquid is stored in member 25. As in the previously described embodiment, there is no direct gas communication between the generator and the absorber or reservoir.

As the heating period proceeds, the liquid level lowers in vessels 70 and 74 until the level reaches trap 41 when this trap blows as in the previous embodiment. The consequent heating of trap 41 causes the heat supply to be shut down.

The absorption period now starts as in the previous embodiment. Vessel 13 is cooled due to radiation. This causes a reduction in pressure, and vessel 13 draws in liquid which results in absorption and further reduction in pressure. The level communicating with the absorber is thus kept down to the level of the connection 71. Thus the vessel 13 functions as the like numbered vessel in the previously described embodiment.

The evaporator acquires a very low temperature during the absorption period and when its temperture rises to a predetermined value due to lack of further effective absorption capacity, the heat is again turned on to start a new heating period.

In an apparatus built in accordance with Fig. 2, the height of vessel 74 was approximately eight (8) inches. As in the earlier embodiment, I used ammonia, water and a small amount of sodium chromate.

While I have described two embodiments which are much alike, it will be understood that the invention may be embodied in a variety of quite different forms.

What I claim is:

1. Absorption refrigerating apparatus of the kind having alternate periods of vapor expulsion from solution and absorption at different pressures comprising a vapor expulsion member, an absorption liquid storage reservoir situated generally higher than said member and connected thereto so as to hold liquid at a higher level than the free surface of liquid in said member, means to continuously cool said storage reservoir, and means to circulate absorption liquid between said member and said reservoir.

2. Absorption refrigerating apparatus of the kind having alternate periods of vapor expulsion and absorption at different pressures comprising a vapor expeller, a reservoir, conduits providing a circulation circuit for liquid between said expeller and said reservoir, and means to withdraw liquid from said circuit during the absorption period and retain the withdrawn liquid in stagnant condition.

3. In an absorption refrigerating apparatus of the kind having alternate periods of vapor expulsion and absorption at different pressures, a generator, a dead-end hollow element connected to the liquid space of said generator members providing with said generator a circuit for circulation of absorption liquid, and a liquid heat exchanger in said circuit.

4. In an absorption refrigerating apparatus of the kind having alternate periods of vapor expulsion and absorption at different pressures, a generator, a dead-end hollow element connected to and extending upwardly from the liquid space of said generator members providing with said generator a circuit for circulation of absorption liquid, and a liquid heat exchanger in said circuit.

5. In an absorption refrigerating apparatus of the kind having alternate periods of vapor expulsion and absorption at different pressures, a generator, a dead-end hollow element connected to and extending upwardly from the liquid space of said generator, means to heat said element during the expulsion periods, means to cool said element during the absorption periods, members providing with said generator a circuit for circulation of absorption liquid, and a liquid heat exchanger in said circuit.

6. In an absorption refrigerating system of the kind having alternate periods of vapor expulsion from solution and absorption at different pressures, the improvement which consists in maintaining a cold body of absorption liquid while heating absorption liquid to expel vapor, maintaining liquid to prevent passage of vapor between the cold liquid and the expelled vapor, and blowing out the liquid so maintained with the expelled vapor.

7. In an absorption refrigerating system of the kind having alternate periods of vapor expulsion from solution and absorption at different pressures, the improvement which consists in maintaining a cold body of absorption liquid while heating absorption liquid to expel vapor, maintaining sealing liquid to prevent passage of vapor between the cold liquid and the expelled vapor so long as liquid is above a given level in the generator, and blowing the sealing liquid with the expelled vapor when the liquid in the generator falls below a predetermined level.

8. In an absorption refrigerating system of the kind having alternate periods of vapor expulsion from solution and absorption at different pressures, the improvement which consists in maintaining a cold body of absorption liquid while heating absorption liquid to expel vapor, maintaining liquid to prevent passage of vapor between the cold liquid and the expelled vapor so long as liquid is above a given level in the generator, displacing the liquid so maintained by expelled vapor when the liquid in the generator falls below a predetermined level, and controlling heating of the liquid in response to such displacement of liquid by vapor.

9. In an intermittent absorption refrigerating system, a generator, a reservoir, an evaporator, a condenser, means for conducting vapor to the condenser during the heating period, means to conduct vapor from the generator to the reservoir at the end of the heating period, and heat control means alterable due to said passage of vapor to the reservoir.

10. In an intermittent absorption refrigerating system, a generator, a continuously cooled absorption liquid reservoir, means to produce flow of absorption liquid between the generator and the reservoir, a condenser, means to conduct vapor from the generator to the condenser, means to conduct vapor from the generator to the reservoir when substantially a given amount of vapor has been expelled from solution during the heating period, and heat control means responsive to passage of vapor from the generator to the reservoir.

11. In an absorption refrigerating apparatus of the kind having alternate periods of vapor expulsion from solution and absorption at different pressures, a generator, an evaporator and a plurality of members adapted to hold liquid above liquid in the generator and connected to the liquid space but not the gas space of the generator nor the evaporator during substantially the entire heating period.

12. In an intermittent absorption refrigeration system, a generator, a member for holding cold absorption liquid, a connection between said generator and said member having a low point at a level corresponding to expulsion of a given amount of refrigerant and adapted to conduct gas from the generator to said member when the liquid surface recedes to said level, and means independent of said connection for circulating liquid through the generator including a liquid heat exchanger.

13. In an intermittent absorption refrigerating system, a generator, a reservoir, means to cool said reservoir, means to flood said reservoir during the heating period, means to maintain said reservoir colder than the generator when the generator is heated, an inverted vessel having liquid communication with said reservoir, and means to cool said vessel when heat is shut off to cause said vessel to withdraw liquid from said reservoir.

14. In an intermittent absorption refrigerating system, an absorber, means to flood said absorber during the heating period, and an inverted vessel having liquid communication with said absorber and adapted to be cooled to withdraw liquid from the absorber.

15. In an intermittent absorption refrigerating system, an absorber, means to flood said absorber during the heating period, and an inverted vessel having liquid communication with said absorber and adapted to be cooled to withdraw liquid from the absorber, the volume of said inverted vessel being greater than the increase of volume of the absorption liquid during the absorption period.

16. In an intermittent absorption refrigeration system, means to simultaneously heat, cool and store absorption liquid, means to form a liquid trap between cool stored absorption liquid and expelled vapor, and means for quickly starting an absorption period by blowing said trap and passing vapor from the heated zone directly to the cold stored liquid.

17. In an absorption refrigeration apparatus having alternate periods of vapor expulsion from solution and evaporation to produce refrigeration and including a generator and an absorption liquid circuit connected to the generator, the method of regulating the rate of absorption which comprises creating a liquid column pressure head below the point of entrance of gas into absorption liquid for forcing the gas into the absorption liquid and varying the liquid column pressure head in accordance with the effectiveness of absorption of the gas.

18. In an absorption refrigeration apparatus having alternate periods of vapor expulsion from solution and evaporation to produce refrigeration and including a generator and an absorption liquid circuit connected to the generator, the method of regulating the rate of absorption which comprises creating a liquid column pressure head below the point of entrance of gas into absorption liquid for forcing the gas into the absorption liquid and varying the liquid column pressure head by moving liquid vertically due to accumulation of unabsorbed gas.

19. In an absorption refrigeration apparatus having alternate periods of vapor expulsion from solution and evaporation to produce refrigeration and including a generator and an absorption liquid circuit connected to the generator, said circuit having a dead-end top portion, the method of regulating the rate of absorption which comprises creating a liquid column pressure head below the point of entrance of gas into absorption liquid for forcing the gas into the absorption liquid and utilizing gas accumulating in the dead end top portion to displace liquid downwardly to decrease the gas forcing head.

20. In an absorption refrigeration system having alternate periods of vapor expulsion from solution and evaporation to produce refrigeration, means to hold a column of liquid, means to introduce gas at a given level into said column, and means to raise liquid above said level during the expulsion period and permitting liquid to fall below said level during the absorption period.

21. In an absorption refrigeration system having alternate periods of vapor expulsion from solution and evaporation to produce refrigeration, means to hold a column of liquid, means to introduce gas at a given level into said column, and periodically heated means to raise liquid above said level during the expulsion period and permitting liquid to fall below said level during the absorption period.

22. In an absorption refrigeration system having alternate periods of vapor expulsion from solution and evaporation to produce refrigeration, an absorption liquid containing member, members providing a liquid column having a gas space thereabove, an evaporator connected to said gas space, liquid containing communicating means between said absorption liquid containing member and said column, dead-end liquid containing structure extending above and connected to said absorption liquid containing member, a gas communication between said gas space and said structure, and means to vary the level of surface of liquid in said liquid column with respect to the point of communication of said gas connection with the members above the absorption liquid containing member.

23. In an absorption refrigeration system having alternate periods of vapor expulsion from solution and evaporation to produce refrigeration, an absorption liquid containing member, members providing a liquid column having a gas space thereabove, an evaporator connected to said gas space, liquid containing communicating means between said absorption liquid containing member and said column, dead-end liquid containing structure extending above and connected to said absorption liquid containing member, a gas communication between said gas space and the said structure, and vapor producing means to vary the level of surface of liquid in said liquid column with respect to the point of communication of said gas connection with the members above the absorption liquid containing member.

24. In an absorption refrigeration system having alternate periods of vapor expulsion from solution and evaporation to produce refrigeration, an absorption liquid containing member, members providing a liquid column having a gas space thereabove, an evaporator connected to said gas space, liquid containing communicating means between said absorption liquid containing member and said column, dead-end liquid containing structure extending above and connected to said absorption liquid containing member, a gas communication between said gas space and said structure above the absorption liquid containing member, and an inverted bottle device to vary the level of surface of liquid in said liquid column with respect to the point of communication of said gas connection with the members above the absorption liquid containing member.

25. In an absorption refrigeration system having alternate periods of vapor expulsion from solution and evaporation to produce refrigeration, an absorption liquid containing member, members providing a liquid column having a gas space thereabove, an evaporator connected to said gas space, liquid containing communicating means between said absorption liquid containing member and said column including a vapor lift member, dead-end liquid containing structure extending above and connected to said absorption liquid containing member, a gas communication between said gas space and said structure, and means to vary the level of surface of liquid in said liquid column with respect to the point of communication of said gas connection with the members above the absorption liquid containing member.

26. In an absorption refrigeration system having alternate periods of vapor expulsion from solution and evaporation to produce refrigeration, an absorption liquid containing member, members providing a liquid column having a gas space thereabove, an evaporator connected to said gas space, liquid containing communicating means between said absorption liquid containing member and said column, dead-end liquid containing structure extending above and connected to said absorption liquid containing member, a gas communication between said gas space and said structure, means to continuously cool said structure, and means to vary the level of surface of liquid in said liquid column with respect to the point of communication of said gas connection with the members above the absorption liquid containing member.

27. In an absorption refrigeration system having alternate periods of vapor expulsion from solution and evaporation to produce refrigeration, an absorption liquid containing member, members providing a liquid column having a gas space thereabove, an evaporator connected to said gas space, liquid containing communicating means between said absorption liquid containing member and said column, dead-end liquid containing structure exposed to atmosphere extending above and connected to said absorption liquid containing member, a gas communication between said gas space and said structure, members above the absorption liquid containing member, and means dependent on formation of vapor to vary the level of surface of liquid in said liquid column with respect to the point of communication of said gas connection with the members above the absorption liquid containing member.

28. In an absorption refrigeration system having alternate periods of vapor expulsion from solution and evaporation to produce refrigeration, an analyzer column, absorption liquid containing structure disposed generally parallel to said column, an evaporator connected to the upper part of said column, a communication between said analyzer column and said structure, and means to close said communication with liquid during the vapor expulsion period.

ALBERT R. THOMAS.